United States Patent
Lambermont et al.

(10) Patent No.: US 10,025,311 B2
(45) Date of Patent: Jul. 17, 2018

(54) AUTOMATED VEHICLE SENSOR CONTROL SYSTEM

(71) Applicant: DELPHI TECHNOLOGIES, INC., Troy, MI (US)

(72) Inventors: Serge Lambermont, Singapore (SG); Junqing Wei, Bridgeville, PA (US); Jong Ho Lee, Pittsburgh, PA (US); Wenda Xu, Pittsburgh, PA (US)

(73) Assignee: Delphi Technologies, Inc., Troy, MI (US)

( * ) Notice: Subject to any disclaimer, the term of this patent is extended or adjusted under 35 U.S.C. 154(b) by 111 days.

(21) Appl. No.: 15/336,942

(22) Filed: Oct. 28, 2016

(65) Prior Publication Data
US 2018/0120845 A1 May 3, 2018

(51) Int. Cl.
*G05D 1/00* (2006.01)
*G05D 1/02* (2006.01)

(52) U.S. Cl.
CPC ........... *G05D 1/0094* (2013.01); *G05D 1/024* (2013.01); *G05D 1/0246* (2013.01); *G05D 1/0257* (2013.01)

(58) Field of Classification Search
CPC .. G05D 1/0094; G05D 1/0257; G05D 1/0246; G05D 1/024

USPC ......................................................... 701/23
See application file for complete search history.

(56) References Cited

U.S. PATENT DOCUMENTS

| | | | |
|---|---|---|---|
| 5,128,874 A | 7/1992 | Bhanu et al. | |
| 9,090,259 B2 | 7/2015 | Dolgov et al. | |
| 2007/0055446 A1 | 3/2007 | Schiffmann et al. | |
| 2013/0245877 A1* | 9/2013 | Ferguson | B60R 1/00 701/23 |
| 2013/0335569 A1 | 12/2013 | Einecke et al. | |
| 2018/0086280 A1* | 3/2018 | Nguyen | B60R 11/00 |

\* cited by examiner

*Primary Examiner* — Brian P Sweeney
(74) *Attorney, Agent, or Firm* — Lawrence D. Hazelton

(57) ABSTRACT

A sensor-control system for operating an automated vehicle includes a first sensor, a second sensor, and a controller. The first sensor is used to detect objects proximate to a host-vehicle. The first sensor is characterized by a first-sensing-technology. The second sensor is used to detect objects proximate to the host-vehicle. The second sensor is characterized by a second-sensing-technology different from the first-sensing-technology. The controller is in communication with the first sensor and the second sensor. A location of an object detected by the first-sensor is used to select a field-of-view of the second-sensor.

6 Claims, 2 Drawing Sheets

AUTOMATED VEHICLE SENSOR CONTROL SYSTEM

TECHNICAL FIELD OF INVENTION

This disclosure generally relates to a sensor-control system for operating an automated vehicle, and more particularly relates to a system that uses a location of an object detected by a first-sensor to select a field-of-view of a second-sensor, where the sensing technology of the first sensor is different from the second sensor.

BACKGROUND OF INVENTION

It is known to equip automated with different type or kinds of sensors, a camera, a radar-unit, and a lidar-unit for example. It is recognized that each type of sensor has advantages and disadvantages when compared to a different type of sensor.

SUMMARY OF THE INVENTION

In accordance with one embodiment, a sensor-control system for operating an automated vehicle is provided. The system includes a first sensor, a second sensor, and a controller. The first sensor is used to detect objects proximate to a host-vehicle. The first sensor is characterized by a first-sensing-technology. The second sensor is used to detect objects proximate to the host-vehicle. The second sensor is characterized by a second-sensing-technology different from the first-sensing-technology. The controller is in communication with the first sensor and the second sensor. A location of an object detected by the first-sensor is used to select a field-of-view of the second-sensor.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
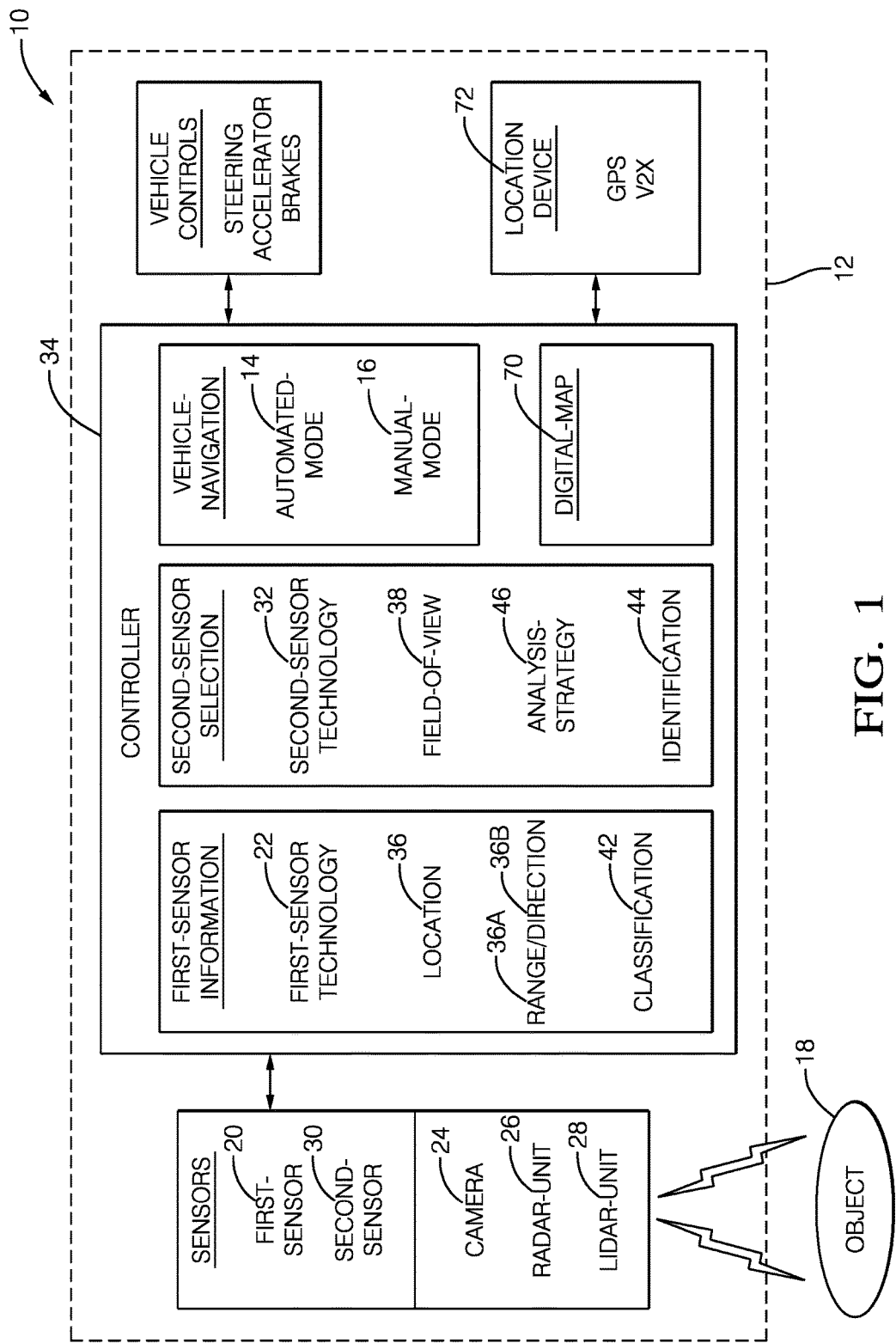
FIG. 1 is a diagram of a sensor-control system in accordance with one embodiment.

FIG. 1 illustrates a non-limiting example of a sensor-control system 10, hereafter referred to as the system 10, which is suitable for use by an automated vehicle, for example a host-vehicle 12. The examples presented herein are generally directed to instances when the host-vehicle 12 is being operated in an automated-mode 14, i.e. a fully autonomous mode, where a human operator (not shown) of the host-vehicle 12 does little more than designate a destination to operate the host-vehicle 12. However, it is contemplated that the teachings presented herein are useful when the host-vehicle 12 is operated in a manual-mode 16 where the degree or level of automation may be little more than providing steering advice to the human operator who is generally in control of the steering, accelerator, and brakes of the host-vehicle 12, i.e. the system 10 assists the human operator as needed to reach the destination and/or avoid a collision.

The system 10 includes a first sensor 20 used to detect objects (e.g. the object 18) proximate to a host-vehicle 12. The first sensor 20 is generally characterized by a first-sensing-technology 22 used by the first-sensor to detect the object 18. By way of example and not limitation, the first sensor 20 may be a camera 24 that uses known image capture technology to detect the object 18, a radar-unit 26 that uses known radar technology to detect the object 18, or a lidar-unit 28 that uses known lidar technology to detect the object 18. The system also includes a second sensor 30 used to detect objects proximate to the host-vehicle. The second sensor 30 is similarly characterized by a second-sensing-technology 32 that is advantageously different from the first-sensing-technology 22, the advantage of which will become apparent in the further description of the system 10 that follows. That the first-sensor-technology 22 is specified as different from the second-sensor-technology 32 is not meant to suggest that every sensor on the host-vehicle 12 must be based on a different sensor-technology. However, the examples presented herein will serve show the benefit of the system 10 having at least two different sensor-technologies available to detect and identify or classify various instances of the object 18, e.g. (see FIG. 2) a pedestrian 52, an other-vehicle 54, a stop-sign 56, a railroad-sign 58, a train 60 traveling on railroad-tracks 68, a speed-limit-sign 64, a traffic-signal 66, or road-markings 62.

The system 10 includes a controller 34 in communication with the first sensor 20 and the second sensor 30. The communication may be by way of, but not limited to, wires, wireless-communication, or optical-fiber as will be recognized by those in the art. The controller 34 is configured to determine a location 36 of the object 18 detected by the first sensor 20. It is envisioned that the location 36 will be described in coordinates that use the host-vehicle 12 the point-of-reference, i.e. the location 36 is specified relative to some point on the host-vehicle 12 such as the center of the front-bumper of the host-vehicle 12, or the position where the first sensor 20 and/or the second sensor 30 are mounted on the host-vehicle. For example, the location 36 may be specific as a range 36A and a direction 36B from the first sensor 20 to the object 18. However, it is recognized that some other point of reference could be used such as global-position-sensor (GPS) coordinates, as will be recognized by those in the art.

It was recognized that in some situations one sensor technology has the advantage for initially detecting the object 18, while another sensor technology may be better suited to identify or monitor some characteristic of the object 18. In order to reduce the field-of-view of one sensor, e.g. the second sensor 30, and thereby reduce the data-processing burden on the controller 34, the location 36 that was determined using information from the first sensor 20 may be advantageously used to select a field-of-view 38 of the second sensor 30. As used herein, the field-of-view 38 may include a direction (e.g. azimuth angle and/or elevation angle) and/or a field-size (e.g. zoom-factor, field-angle, field-shape).

Figure 2:
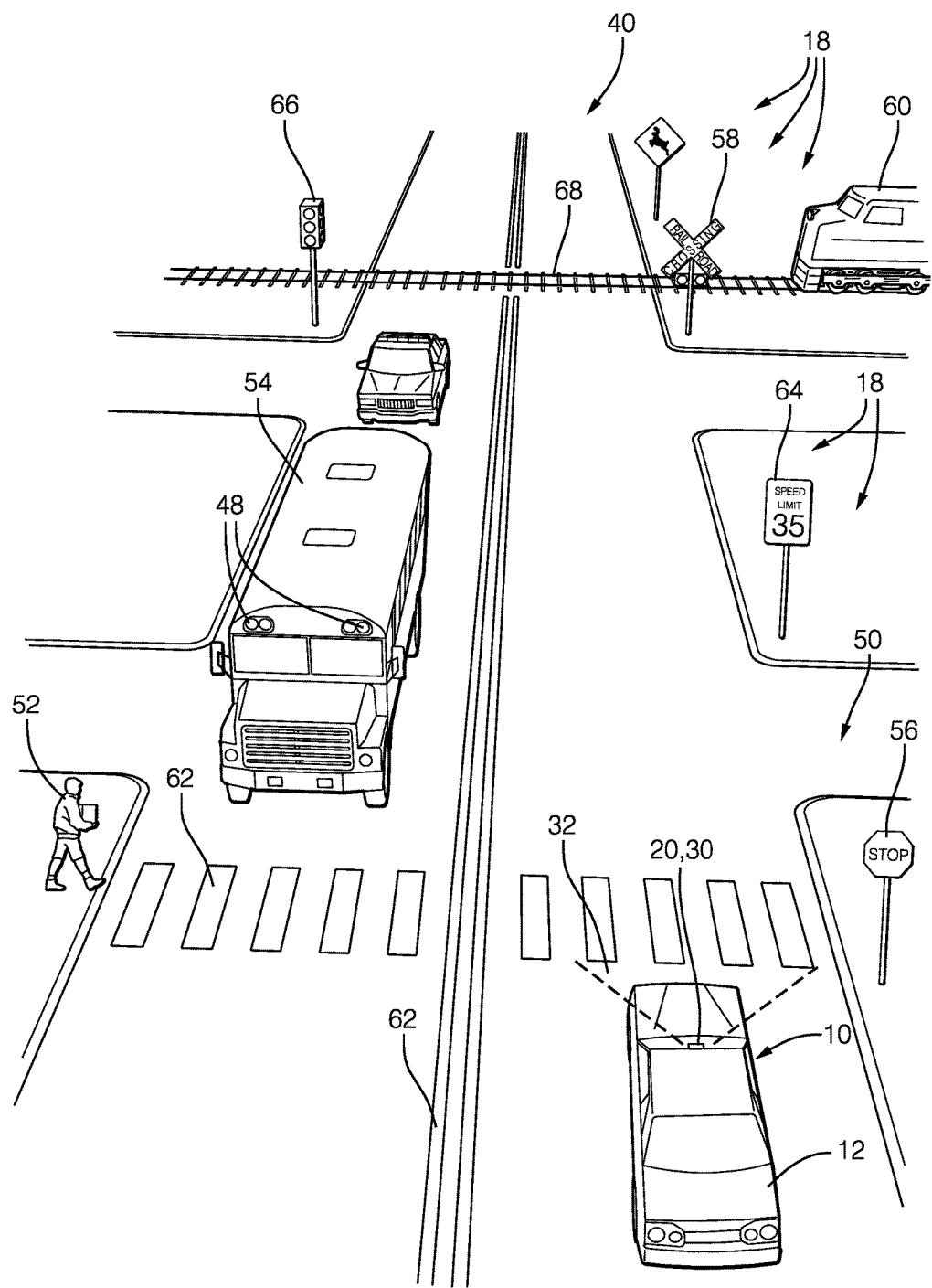
FIG. 2 is a traffic-scenario encountered by the system of FIG. 1 in accordance with one embodiment.

FIG. 2 illustrates a non-limiting example of a traffic-scenario 40 that the host-vehicle 12 may encounter. Typically, the object 18 initially detected by the first sensor 20 will be in the field-of-view 38. For example, the lidar-unit 28 may be able to more readily make an initial determination that a reflective road sign such as the stop-sign 56, the speed-limit-sign 64, or the railroad-sign 58 is present proximate to the host-vehicle 12, but because of resolution limitations, the lidar-unit 28 may not be able to identify the type of sign and/or discern text on the sign. That is, if the first sensor 20 is the lidar-unit 28, then the classification 42 of the object 18 may be 'reflective-sign', but the lidar-unit 28 may not be particularly useful to determine a shape and/or content of the reflective-sign. If the second sensor 30 is the camera 24, then the field-of-view 38 for the camera 24 is selected so the amount of image processing by the controller 34 necessary to determine an identification 44 of the sign based on sign-shape and/or sign-content. It is contemplated that the field-of-view 38 may also be used to control a zoom-in/out function and/or a camera-direction function if the camera 24 is so equipped.

By way of another example, if the first sensor 20 is the radar-unit 26, then the radar-unit 26 may more readily detect the other-vehicle 54 moving towards the host-vehicle 12, especially when the other-vehicle 54 is more distant from the host-vehicle 12 than is illustrated in FIG. 2. Accordingly, the classification 42 for this example may be 'vehicle'. If the second sensor 30 is the camera 24, then the field-of-view 38 may be focused on the other-vehicle 54 to determine the type of vehicle, i.e. the identification 44, in this example a school-bus. It is contemplated that an analysis-strategy 46 for image processing may be selected to more readily detect if the flashers 48 of the school bus have been activated indicating that the school bus is stopping to pick-up the pedestrian 52. If the flashers 48 are activated, the host-vehicle 12 may be programmed to stop or remain stopped until at least the flashers 48 have been turned off.

As shown above, the classification 42 of the object 18 is determined based on information from the first sensor 20, and the classification 42 is used to select the analysis-strategy 46 for information from the second sensor 30. In yet another example, if the radar-unit 26 or the lidar-unit 28 detects a forward-vehicle (not shown) located forward of the host-vehicle, the analysis-strategy 46 used for image processing images from the camera 24 may be optimized to detect or search for turn/brake lights of the forward-vehicle.

While the examples above are instance when the object 18 is present in the field-of-view 38, it is contemplated that in some situations it may be advantageous if the object 18 was not in the field-of-view 38, i.e. the field-of-view 38 is directed in a direction that is substantially different from the direction of the location 36. For example, if the first sensor 20 is the camera 24, and it is determined that the identification 44 of the object 18 is the railroad-sign 58, then the field-of-view 38 of the radar-unit 26 may be directed along the railroad-tracks 68 well away from the railroad-sign 58 to detect the presence of the train 60 and determine if the train 60 is moving towards the railroad-crossing indicated by the railroad-sign 58.

While the examples given above are generally directed to examples where the system 10 has two types of sensor, i.e. two distinct sensor technologies, it is contemplated that the host-vehicle may be equipped with sensor that represent three or more sensor technologies. In this case, it is contemplated that the classification 42 of the object 18 may be determined based on information from the first sensor 20, and the classification 42 is used to select which of a plurality of sensors (the camera 24, the radar-unit 26, the lidar-unit 28) is used as the second sensor. For example, as suggested above, if the object 18 is the railroad-sign 58, it may be preferable to search for the train 60 using the radar-unit 26 rather than the lidar-unit 28 as the radar-unit 26 may be able to detect the train 60 at a further distance than the lidar-unit 28. However, if the object 18 is the stop-sign 56, it may be advantageous to use the lidar-unit 28 to detect an approaching-vehicle (not shown) approaching the host-vehicle from the side-road 50.

The system 10 may include a digital-map 70, where a map-location on the digital-map 70 is typically determined using a location-device 72 such as a global-positioning-system (GPS), or alternatively using vehicle-to-infrastructure (V2I) communications, vehicle-to-vehicle (V2V) communications, and/or vehicle-to-pedestrian (V2P) communications, which may be generically labeled as V2X communications, whereby the map-location of the host-vehicle 12 is determined relative to GPS coordinates received via V2X, as will be recognized by those in the art. However, sometimes the GPS may not be available or may not provide sufficient accuracy, so a more precise map-location may be determined based on the location 36 of the object 18. That is, if the object 18 is identified to be the stop-sign 56 for example, the map-location on the digital-map 70 can be determined or determined more accuracy by knowing the location 36 of the stop-sign 56 relative to the host-vehicle 12.

Accordingly, a sensor-control system (the system 10), a controller 34 for the system 10, and a method of operating the system 10 is provided. The system 10 provides for faster and more reliable detection/classification/identification of objects, which can be useful for localization on the digital-map 70 and or collision-avoidance/vehicle-navigation.

While this invention has been described in terms of the preferred embodiments thereof, it is not intended to be so limited, but rather only to the extent set forth in the claims that follow.

We claim:

1. A sensor-control system for operating an automated vehicle, said system comprising:
   a first sensor used to detect objects proximate to a host-vehicle, said first sensor characterized by a first-sensing-technology;
   a second sensor used to detect objects proximate to the host-vehicle, said second sensor characterized by a second-sensing-technology different from the first-sensing-technology;
   a controller in communication with the first sensor and the second sensor, wherein a location of an object detected by the first-sensor is used to select a field-of-view of the second-sensor.

2. The system in accordance with claim 1, wherein the first sensor is one of a camera, a lidar-unit, and a radar-unit; the second sensor is one of a camera, a lidar-unit, and a radar-unit; and the first sensor is different from the second sensor.

3. The system in accordance with claim 1, wherein the object is present in the field-of-view.

4. The system in accordance with claim 1, wherein the object is not present in the field-of-view.

5. The system in accordance with claim 1, wherein a classification of the object is determined based on information from the first sensor, and the classification is used to select an analysis-strategy for information from the second sensor.

6. The system in accordance with claim 1, wherein a classification of the object is determined based on information from the first sensor, and the classification is used to select which of a plurality of sensors is used as the second sensor.

* * * * *